(12) United States Patent
Bai

(10) Patent No.: US 10,678,942 B2
(45) Date of Patent: Jun. 9, 2020

(54) INFORMATION PROCESSING METHOD AND RELATED PRODUCTS

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 172 days.

(21) Appl. No.: 15/986,150

(22) Filed: May 22, 2018

(65) Prior Publication Data
US 2018/0365443 A1    Dec. 20, 2018

(30) Foreign Application Priority Data
Jun. 20, 2017   (CN) .......................... 2017 1 0474476

(51) Int. Cl.
| G06F 7/04 | (2006.01) |
| H04N 7/16 | (2011.01) |
| G06F 21/62 | (2013.01) |
| H04W 12/02 | (2009.01) |
| G06F 21/31 | (2013.01) |
| G06F 21/32 | (2013.01) |

(52) U.S. Cl.
CPC .......... G06F 21/6245 (2013.01); G06F 21/31 (2013.01); G06F 21/316 (2013.01); H04W 12/02 (2013.01); G06F 21/32 (2013.01)

(58) Field of Classification Search
CPC .... G06F 21/6245; G06F 21/31; G06F 21/316; G06F 21/32; H04W 12/02
See application file for complete search history.

(56) References Cited

U.S. PATENT DOCUMENTS

| 9,286,482 B1 * | 3/2016 | Dumont ................. G06F 21/32 |
| 2007/0111707 A1 * | 5/2007 | Pomerantz ............ H04M 15/47 455/410 |
| 2009/0025089 A1 * | 1/2009 | Martin .................... G06F 21/31 726/28 |

(Continued)

FOREIGN PATENT DOCUMENTS

| CN | 102004881 A | 4/2011 |
| CN | 103077356 A | 5/2013 |

(Continued)

OTHER PUBLICATIONS

International search report issued in corresponding international application No. PCT/CN2018/085903 dated Aug. 8, 2018.

(Continued)

*Primary Examiner* — John B King
*Assistant Examiner* — Darshan I Dhruv
(74) *Attorney, Agent, or Firm* — Young Basile Hanlon & MacFarlane, P.C.

(57) ABSTRACT

An information processing method and related products are provided. The method includes obtaining unlocking-related information corresponding to a current successful unlocking operation; hiding or deleting privacy information of at least one application when a relationship between the unlocking-related information and recorded unlocking habit information does not meet a preset condition.

17 Claims, 5 Drawing Sheets

---

A TERMINAL DEVICE OBTAINS UNLOCKING-RELATED INFORMATION CORRESPONDING TO A CURRENT SUCCESSFUL UNLOCKING OPERATION — 101

THE TERMINAL DEVICE HIDES OR DELETES PRIVACY INFORMATION OF AT LEAST ONE APPLICATION WHEN THE UNLOCKING-RELATED INFORMATION AND RECORDED UNLOCKING HABIT INFORMATION DO NOT MEET A PRESET CONDITION — 102

(56) References Cited

U.S. PATENT DOCUMENTS

| | | | |
|---|---|---|---|
| 2014/0283128 A1 | 9/2014 | Shepherd et al. | |
| 2015/0213242 A1 | 7/2015 | Taylor | |
| 2015/0281951 A1* | 10/2015 | Geng | H04W 12/02 |
| | | | 726/28 |
| 2016/0117500 A1* | 4/2016 | Li | G06F 21/50 |
| | | | 726/23 |
| 2016/0283741 A1 | 9/2016 | Lin | |
| 2017/0124328 A1* | 5/2017 | Krishnapura | G06F 21/57 |
| 2017/0277881 A1* | 9/2017 | Luo | H04W 12/08 |
| 2018/0024846 A1* | 1/2018 | Wu | G06F 21/31 |
| | | | 715/741 |
| 2018/0239915 A1* | 8/2018 | Wang | G06F 21/45 |
| 2018/0302786 A1* | 10/2018 | Yu | H04M 1/725 |
| 2019/0197226 A1* | 6/2019 | Hu | G06K 9/00288 |

FOREIGN PATENT DOCUMENTS

| | | |
|---|---|---|
| CN | 104361303 A | 2/2015 |
| CN | 104573576 A | 4/2015 |
| CN | 105872250 A | 8/2016 |
| CN | 106126984 A | 11/2016 |
| EP | 3349424 A1 | 7/2018 |
| WO | 2016034090 A1 | 3/2016 |
| WO | 2017059570 A1 | 4/2017 |

OTHER PUBLICATIONS

Extended European search report issued in corresponding European application No. 18172299.2 dated Nov. 14, 2018.

\* cited by examiner

INFORMATION PROCESSING METHOD AND RELATED PRODUCTS

CROSS-REFERENCE TO RELATED APPLICATION(S)

This application claims priority to Chinese Patent Application No. 201710474476.2, filed on Jun. 20, 2017, the disclosure of which is hereby incorporated by reference in its entirety.

TECHNICAL FIELD

The present disclosure relates to the field of electronics technology, and particularly to an information processing method and related products.

BACKGROUND

Currently, in order to make it more convenient for users to use application software (APP), for most APPs (such as WeChat®, Alipay®, etc.) installed in terminal devices (such as smartphones, etc.), as long as they have been logged in with login passwords previously, when the user opens these APPs afterwards, main interfaces of these APPs can be accessed directly without entering the login passwords again. However, if the terminal device is lost, security risks may occur, such as information leakage, property loss, or the like. Therefore, how to improve security of the terminal device is a technical problem to be solved.

SUMMARY

Implementations of the present disclosure provide an information processing method and related products to improve security of a terminal device.

According to a first aspect of the implementations of the disclosure, there is provided an information processing method. The method includes the following.

Unlocking-related information corresponding to a current successful unlocking operation is obtained. Privacy information of at least one application is hidden or deleted when the unlocking-related information and recorded unlocking habit information do not meet a preset condition.

According to a second aspect of the implementations of the disclosure, there is provided an information processing device. The device includes a processing unit. The processing unit is configured to: obtain unlocking-related information corresponding to a current successful unlocking operation and hide or delete privacy information of at least one application when the unlocking-related information and recorded unlocking habit information do not meet a preset condition.

According to a third aspect of the implementations of the disclosure, there is provided a terminal device. The terminal device includes a processor, a memory, and one or more programs. The one or more programs are stored in the memory and are configured to be executed by the processor. The programs include instructions configured to perform the following operations.

Unlocking-related information corresponding to a current successful unlocking operation is obtained. Privacy information of at least one application is hidden or deleted when the unlocking-related information and recorded unlocking habit information do not meet a preset condition.

According to a fourth aspect of the implementations of the disclosure, there is provided a computer readable storage medium. The computer readable storage medium is configured to store computer programs for electronic data interchange. The computer programs are operable with a computer to perform all or part of the operations described in the first aspect of the implementations of the disclosure.

According to a fifth aspect of the implementations of the disclosure, there is provided a computer program product. The computer program product includes a non-transitory computer-readable storage medium that stores computer programs. The computer programs are operable with a computer to perform all or part of the method in the first aspect of the implementations of the disclosure.

According to schemes of the disclosure, when the unlocking-related information corresponding to the current successful unlocking operation and the recorded unlocking habit information do not meet the preset condition, it indicates that the current unlocking operation is an abnormal unlocking operation; in this situation, the privacy information of the at least one application is hidden or deleted directly to improve the security of the terminal device.

These aspects or other aspects of the disclosure will be concise and easy to understand with reference to the following descriptions in the implementations.

BRIEF DESCRIPTION OF THE DRAWINGS

To describe technical solutions in the implementations of the present disclosure more clearly, the following briefly introduces the accompanying drawings required for describing the implementations.

DETAILED DESCRIPTION

Figure 1:
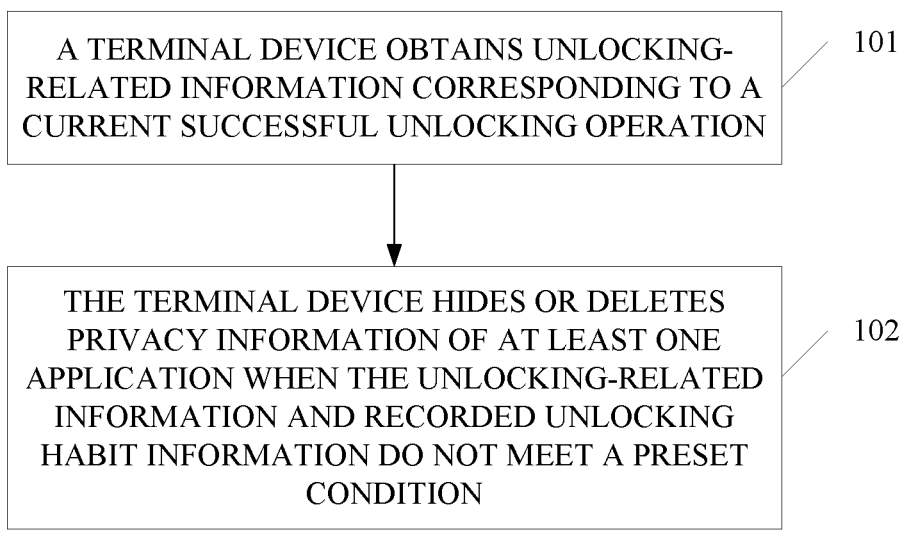
FIG. 1 is a schematic flow chart illustrating an information processing method according to an implementation of the present disclosure.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The following are described in detail.

The terms "first", "second", "third", and "fourth" used in the specification, the claims, and the accompanying drawings of the present disclosure are used for distinguishing between different objects rather than describing a particular order. The terms "include", "comprise", and "have" as well as variations thereof are intended to cover a non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "implementation" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

"Terminal devices", also known as user equipment (UE), are devices that provide voice and/or data connectivity to a user. Examples of terminal devices include handheld devices having wireless connection functions, in-vehicle devices, and the like. Common terminals include, for example, mobile phones, tablets, laptops, palmtops, mobile Internet devices (MID), wearable devices such as smartwatches, smart bracelets, pedometers, and the like.

Hereinafter, the implementations of the disclosure will be interpreted with reference to the accompanying drawings.

According to implementations of the disclosure, an information processing method is provided, in which unlocking-related information corresponding to a current successful unlocking operation is obtained, and when a relationship between the unlocking-related information and recorded unlocking habit information does not meet a preset condition, privacy information of at least one application is hidden or deleted.

In at least one implementation, abnormal information is sent to a designated user when hiding or deleting the privacy information of the at least one application installed in a terminal device, where the abnormal information is configured to indicate that the terminal device is in an abnormal unlocking state.

In at least one implementation, the designated user is determined by the terminal device based on usage information of the terminal device. In at least one implementation, the designated user is a user involved in the most recent communication record of the terminal device or a user having the number of times of communication in a preset time period exceeding a preset value and having a most recent communication time earlier than a current system time by no more than a preset time.

In at least one implementation, the privacy information includes record information, and a setting of privacy information includes a setting of record information. The method further includes the follows. Prompt a user to enter authentication information when the user switches the setting of the record information to a display state from a hidden state, where the authentication information is different from the unlocking authentication information used for unlocking.

FIG. 1 is a schematic flow chart illustrating an information processing method according to an implementation of the present disclosure. The method begins at block 101.

At block 101, a terminal device obtains unlocking-related information corresponding to a current successful unlocking operation.

The current successful unlocking operation refers to an unlocking operation under which the terminal device is unlocked at a current system time and unlocked successfully. The unlocking-related information corresponding to the current successful unlocking operation includes at least one of a screen state, an unlocking time, an unlocking mode used when unlocking authentication information is entered, and time of entry of the unlocking authentication information.

The screen state includes a screen-off state, a screen-on state, and the like. The unlocking mode includes fingerprint unlocking, character password unlocking, pattern unlocking, face recognition unlocking, iris recognition unlocking, and the like.

At block 102, the terminal device hides or deletes privacy information of at least one application when the unlocking-related information and recorded unlocking habit information do not meet a preset condition, in other words, when a relationship between the unlocking-related information and the recorded unlocking habit information does not meet the preset condition.

The privacy information refers to information that one does not want to or is not convenient to tell others. The privacy information of the application includes record information, a login account, a login password corresponding to the login account, contact information, and the like. The record information includes a communication record, favorite information, a browsing record, a diary, a memo, a note, and the like. The communication record includes a call record, a short information communication record, and so on. The call record includes a voice call record, a video call record, and so forth. The short information communication record includes an instant message communication record, a short message communication record, a mail communication record, and the like. The contact information includes friend information, official accounts, and the like.

The application is a third-party application installed in the terminal device or a system application of the terminal device.

The application includes an instant messaging application, a payment application, an audio and video playing application, an office application, a game application, a shopping application, and the like. The unlocking habit information refers to information related to unlocking habit of the user during the use of the terminal device. The unlocking habit information includes a plurality of screen states, a time period corresponding to each screen state, an unlocking mode used in a certain screen state and a time period corresponding to the certain screen state, a time period of entry of the authentication information corresponding to each screen state.

As one implementation, the unlocking-related information corresponding to the current successful unlocking operation includes a screen state i, an unlocking time j, and an unlocking mode k used when the unlocking authentication information is entered. The recorded unlocking habit information includes a screen state I, a time period J corresponding to the screen state I, and an unlocking mode K used in the screen state I and the time period J. Determine that the unlocking-related information and the recorded unlocking habit information meet the preset condition when the screen state i matches the screen state I (for example, the screen state i is the same as the screen state I), the unlocking time j falls within the time period J, and the unlocking mode k matches the unlocking mode K (for example, the unlocking mode k is the same as the unlocking mode K).

For example, assume that the user usually uses a fingerprint unlocking mode in a time period from 18:10 to 18:40 when the terminal device is in a screen-off state, the recorded unlocking habit information will include: screen-off state, time period from 18:10 to 18:40, and fingerprint unlocking mode. Assume that the unlocking-related information corresponding to the current successful unlocking operation includes: screen-off state, unlocking time of 18:25, and fingerprint unlocking mode. In this case, the unlocking-related information corresponding to the current successful unlocking operation and the recorded unlocking habit information meet the preset condition. Assume again that the recorded unlocking habit information includes: a screen-off state, a time period from 18:10 to 18:40, and a fingerprint unlocking mode. When the unlocking-related information corresponding to the current successful unlocking operation includes: screen-on state, unlocking time of 18:25, and fingerprint unlocking mode, the unlocking-related information corresponding to the current successful unlocking operation and the recorded unlocking habit information do not meet the preset condition.

As one implementation, the unlocking-related information corresponding to the current successful unlocking operation includes a screen state i and an unlocking mode k used when the unlocking authentication information is entered. The recorded unlocking habit information includes a screen state I and an unlocking mode K used in the screen state I. Determine that the unlocking-related information and the recorded unlocking habit information meet the preset condition when the screen state i matches the screen state I and the unlocking mode k matches the unlocking mode K.

For example, assume that the user usually uses a fingerprint unlocking mode when the terminal device is in a screen-off state, the recorded unlocking habit information will include: screen-off state and fingerprint unlocking mode. Assume that the unlocking-related information corresponding to the current successful unlocking operation includes: screen-off state and fingerprint unlocking mode. In this case, the unlocking-related information corresponding to the current successful unlocking operation and the recorded unlocking habit information meet the preset condition. Assume again that the recorded unlocking habit information includes: screen-off state and fingerprint unlocking mode. When the unlocking-related information corresponding to the current successful unlocking operation includes: screen-on state and fingerprint unlocking mode, the unlocking-related information corresponding to the current successful unlocking operation and the recorded unlocking habit information do not meet the preset condition.

As one implementation, the unlocking-related information corresponding to the current successful unlocking operation includes an unlocking time j and an unlocking mode k used when the unlocking authentication information is entered. The recorded unlocking habit information includes a time period J and an unlocking mode K used in the time period J. Determine that the unlocking-related information and the recorded unlocking habit information meet the preset condition when the unlocking time j falls within the time period J and the unlocking mode k matches the unlocking mode K.

For example, assume that the user usually uses a fingerprint unlocking mode in a time period from 18:10 to 18:40, the recorded unlocking habit information will include: time period from 18:10 to 18:40 and fingerprint unlocking mode. Assume that the unlocking-related information corresponding to the current successful unlocking operation includes: unlocking time of 18:25 and fingerprint unlocking mode. In this case, the unlocking-related information corresponding to the current successful unlocking operation and the recorded unlocking habit information meet the preset condition. Assume again that the recorded unlocking habit information includes: time period from 18:10 to 18:40 and fingerprint unlocking mode. When the unlocking-related information corresponding to the current successful unlocking operation includes: unlocking time of 18:25 and digital password unlocking mode, the unlocking-related information corresponding to the current successful unlocking operation and the recorded unlocking habit information do not meet the preset condition.

According to schemes of the disclosure, when the unlocking-related information corresponding to the current successful unlocking operation and the recorded unlocking habit information do not meet the preset condition, it indicates that the current unlocking operation is an abnormal unlocking operation; in this situation, the privacy information of the at least one application is hidden or deleted directly, so that security of the terminal device can be improved.

As one implementation, the method further includes the following.

The terminal device sends abnormal information to a designated user when hiding or deleting the privacy information of the at least one application installed in the terminal device, where the abnormal information is configured to indicate that the terminal device is in an abnormal unlocking state.

As one implementation, the designated user is customized by the user.

As one implementation, the designated user is customized by the terminal device according to usage information of the terminal device. As one implementation, the usage information of the terminal device includes a communication record, and the designated user is a communication user involved in the most recent communication recorded in the communication record.

The most recent communication refers to a communication with communication time closest to a current system time. For example, user A and user B are recorded in the communication record, where user A has a communication time T1 and user B has a communication time T2. T1 is 1 minute earlier than the current system time and T2 is 20 seconds earlier than the current system time and consequently, the most recent communication is the communication at T2, and user B is the communication user involved in the most recent communication.

The communication record includes a call record, a short information communication record, and so on. The call record includes a voice call record, a video call record, and so forth. The short information communication record includes an instant message communication record, a short message communication record, a mail communication record, and the like.

As another implementation, the designated user is customized by the terminal device according to usage information of the terminal device in a preset time period. As one implementation, the usage information of the terminal device in the preset time period includes a communication record. The designated user is a communication user whose number of times of communication recorded in the communication record in the preset time period exceeds a preset value and whose communication time of the most recent communication is earlier than the current system time by no more than a preset time.

The preset time period is customized by the user, the terminal device, or the like. The preset time period is not a rest period of the user. For example, if the rest period of the user is 23:00 pm~8:00 am and 12:00 pm~14:00 pm, the preset time period is 8:00 am~12:00 pm and 2:00 pm~23:00 pm. The preset value is customized by the user, the terminal device, or the like.

Assume that user A receives fifty short messages, answers two calls, and dials one call in the preset time period, the fifty short messages, the two calls, and the one call will be recorded in the communication record. In this case, the number of times of communication of user A in the preset time period is 53, that is, 50+2+1=53.

For example, assume that the preset time period is 8:00 am~12:00 pm and 2:00 pm~23:00 pm and the preset value is 50 times. Assume that, in the communication record, user A and user B have the number of times of communication greater than 50 in the preset time period, and the most recent communication time of user A is T1 while the most recent communication time of user B is T2, T1 is 1 minute earlier than the current system time, and T2 is 20 seconds earlier than the current system time, and thus the designated user is user B.

The abnormal information may be text information, voice information, text and voice information, picture information, picture and voice information, and the like. The disclosure is not limited thereto.

As one implementation, each application corresponds to at least one kind of privacy information to be hidden or to be deleted. The hiding or deleting privacy information of at least one application can be achieved as follows. The at least one kind of privacy information to be hidden or to be deleted which corresponds to the at least one application is hidden or deleted.

The at least one kind of privacy information to be hidden or to be deleted which corresponds to each application is customized by the user. For example, Wechat® corresponds to two kinds of private information to be hidden or to be deleted which includes record information and contact information. Alipay® corresponds to two kinds of private information to be hidden or to be deleted which includes a login account and a login password corresponding to the login account.

The privacy information to be hidden or to be deleted which corresponds to different applications can be of the same kind or different kinds. The disclosure is not particularly restricted. The number of types of the privacy information to be hidden or to be deleted which corresponds to different applications can be the same or different. The disclosure is not limited thereto.

The at least one application is at least one application installed in the terminal device, at least one preset application customized by the user, at least one application having a usage priority higher than a preset usage priority, at least one application having a security level higher than a preset security level, or the like.

The usage priority of the application can be customized by the user or determined by the terminal device according to usage information of the application. For example, the terminal device determines the usage priority of the application according to a number of times of usage of the application in a time period, where the more the number of times of usage, the higher the usage priority, vice versa.

The security level of the application can be customized by the user or determined by the terminal device according to application attributes, where each application attribute corresponds to one security level. The application attribute includes payment, instant messaging, news, music, office, and so on. The attributes of payment, instant messaging, office, music, and news correspond to security levels of security level 1, security level 2, security level 3, security level 4, and security level 5 sequentially and respectively, with security level 1>security level 2>security level 3>security level 4>security level 5.

For example, the at least one application includes Wechat® and Alipay®. Wechat® corresponds to two kinds of private information to be hidden or to be deleted which include record information and contact information. Alipay® corresponds to two kinds of private information to be hidden or to be deleted which include a login account and a login password corresponding to the login account. When the unlocking-related information and the recorded unlocking habit information do not meet the preset condition, the terminal device hides or deletes the record information and the contact information of Wechat® as well as the login account and the login password corresponding to the login account of Alipay®.

As one implementation, the privacy information includes record information, and a setting of privacy information includes a setting of record information. For example, setting of an application i includes a private setting and the private setting includes a record information setting. The method further includes the following when record information of the application i is hidden and the application i is one of the at least one application.

The terminal device prompts the user to enter authentication information when the user switches the setting of the record information to a display state from a hidden state. For example, the terminal device prompts the user to enter authentication information when detecting that the record information setting of the application i is set to be displayed, where the authentication information is different from the unlocking authentication information used for unlocking.

Furthermore, the terminal device prompts the user to enter the authentication information as follows. A prompting interface is popped up on a touch display screen of the terminal device and includes text information for prompting the user to enter the authentication information. The text information includes, for example, "please enter fingerprint", "please enter digital password", "please enter pattern password or trajectory password", "please enter answer of the question", or the like.

Figure 2A:
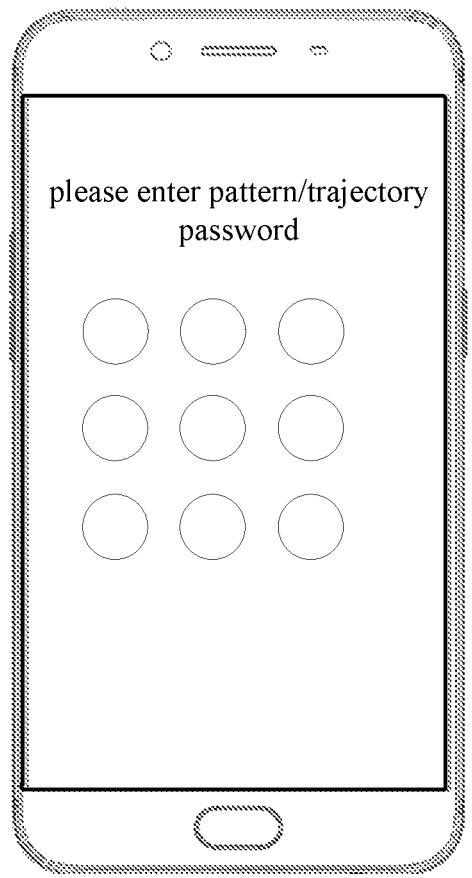
FIG. 2A is a schematic diagram illustrating an interface according to an implementation of the present disclosure.

Furthermore, when the authentication information is the pattern/trajectory password, the prompting interface further includes a pattern/trajectory entering interface. As illustrated in FIG. 2A, FIG. 2A is a schematic diagram illustrating an interface according to an implementation of the present disclosure in which the authentication information is the pattern/trajectory password.

Figure 2C:
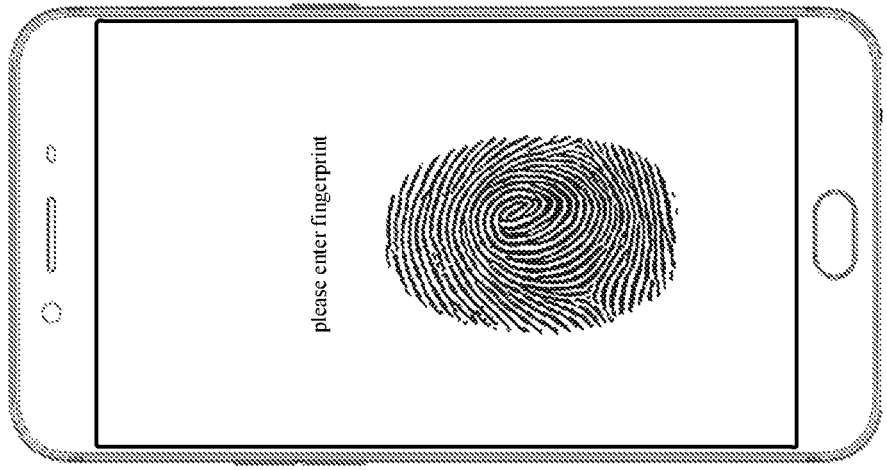
FIG. 2C is a schematic diagram illustrating yet another interface according to an implementation of the present disclosure.
Figure 2B:
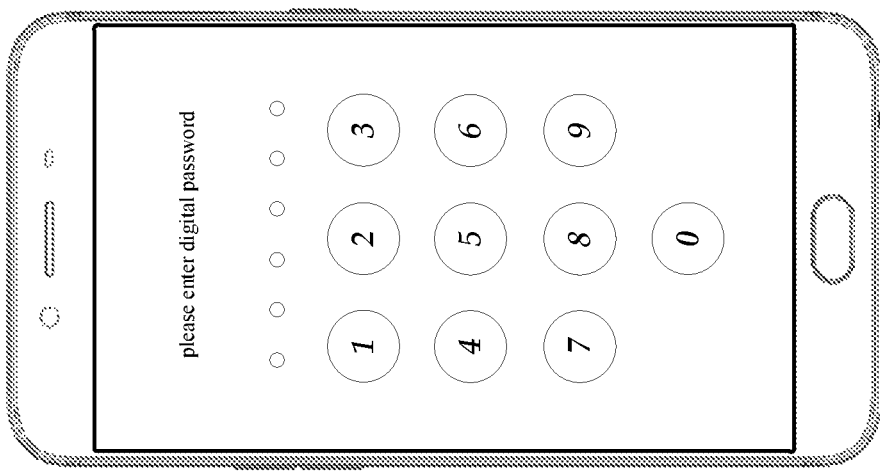
FIG. 2B is a schematic diagram illustrating another interface according to an implementation of the present disclosure.

Alternatively, when the authentication information is the digital password, the prompting interface further includes a digital entering interface. As illustrated in FIG. 2B, FIG. 2B is a schematic diagram illustrating another interface according to an implementation of the present disclosure in which the authentication information is the digital password.

Alternatively, when the authentication information is the fingerprint, the prompting interface further includes a fingerprint pattern. As illustrated in FIG. 2C, FIG. 2C is a schematic diagram illustrating yet another interface according to an implementation of the present disclosure in which the authentication information is the fingerprint.

Figure 2D:
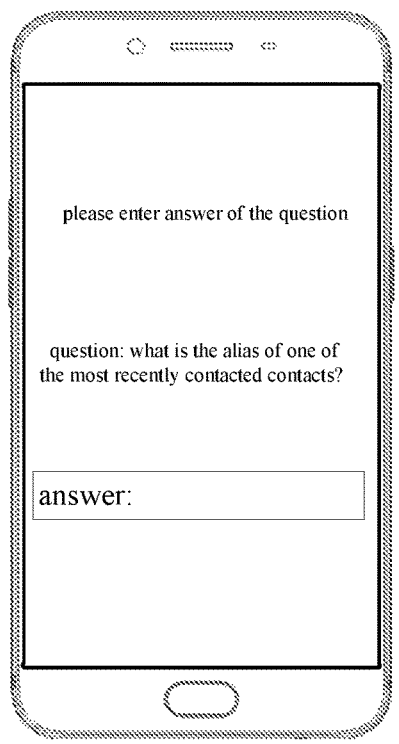
FIG. 2D is a schematic diagram illustrating still another interface according to an implementation of the present disclosure.

Alternatively, when the authentication information is the answer password, the prompting interface further includes question text information. As illustrated in FIG. 2D, FIG. 2D is a schematic diagram illustrating still another interface according to an implementation of the present disclosure in which the authentication information is the answer password.

The authentication information is different from the unlocking authentication information used for unlocking. That is, the authentication information currently prompting the user to enter is different from the unlocking authentication information entered via the current successful unlocking operation. For example, the unlocking authentication information entered via the current successful unlocking operation is information 1 and the authentication information currently prompting the user to enter is information 2, where information 1 is different from information 2.

Furthermore, the authentication information has a type different from that of the unlocking authentication information. For example, the type of the authentication information is a fingerprint, but the type of the unlocking authentication information used for unlocking is a pattern.

Furthermore, the authentication information has a type the same as that of the unlocking authentication information. For example, the type of the authentication information is a fingerprint, and the type of the unlocking authentication information used for unlocking is fingerprint as well.

Figure 2E:
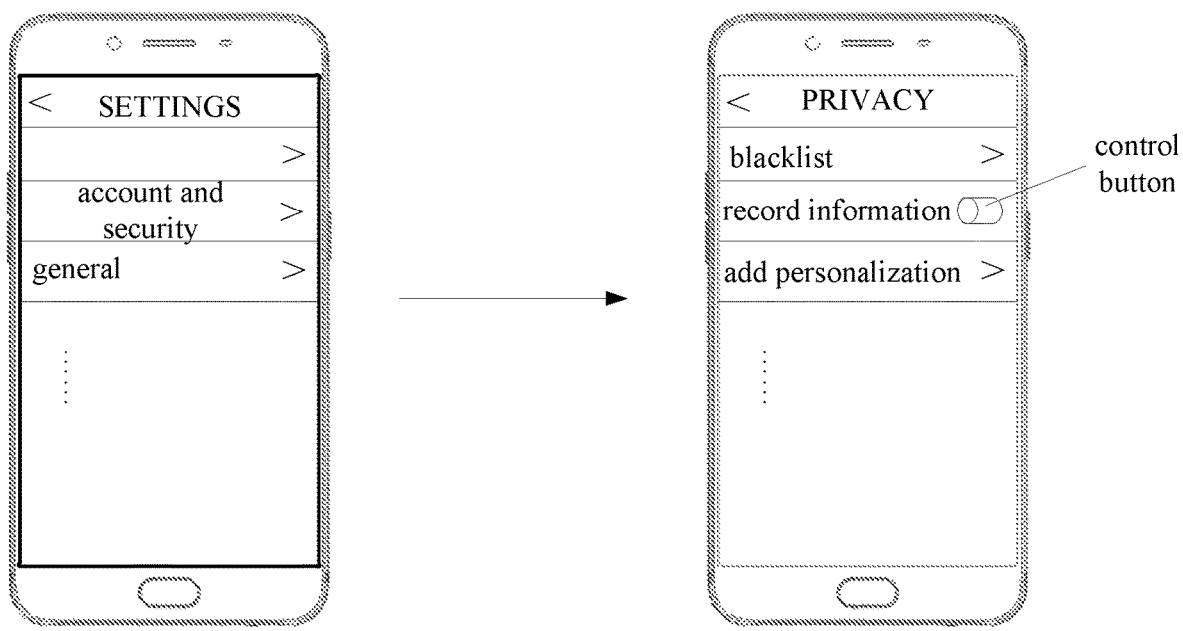
FIG. 2E is a schematic diagram illustrating still another interface according to an implementation of the present disclosure.

FIG. 2E is a schematic diagram illustrating still another interface according to an implementation of the present disclosure. Assume that the application i is Wechat®. As illustrated in FIG. 2E, a setting of Wechat® includes a private setting and the private setting includes a record information setting. If a button of the record information setting is on the left, it means that record information of Wechat® is in a hidden state (that is, is hidden); if the button of the record information setting is on the right, it indicates that the record information of Wechat® is in a displayed state. As illustrated in FIG. 2E, current record information of Wechat® is in the hidden state; when the user clicks the button of the record information setting to switch the record information of WeChat® from the hidden state to the displayed state, the terminal device will prompt the user to enter the authentication information.

The above elaborates the method of the implementation of the disclosure. The following provides a device of the implementation of the disclosure.

According to implementations of the disclosure, a terminal device is provided. The terminal device includes a memory and a processor. The memory is configured to store one or more programs and the processor is coupled with the memory and configured to invoke the one or more programs to perform the foregoing method.

Figure 3:
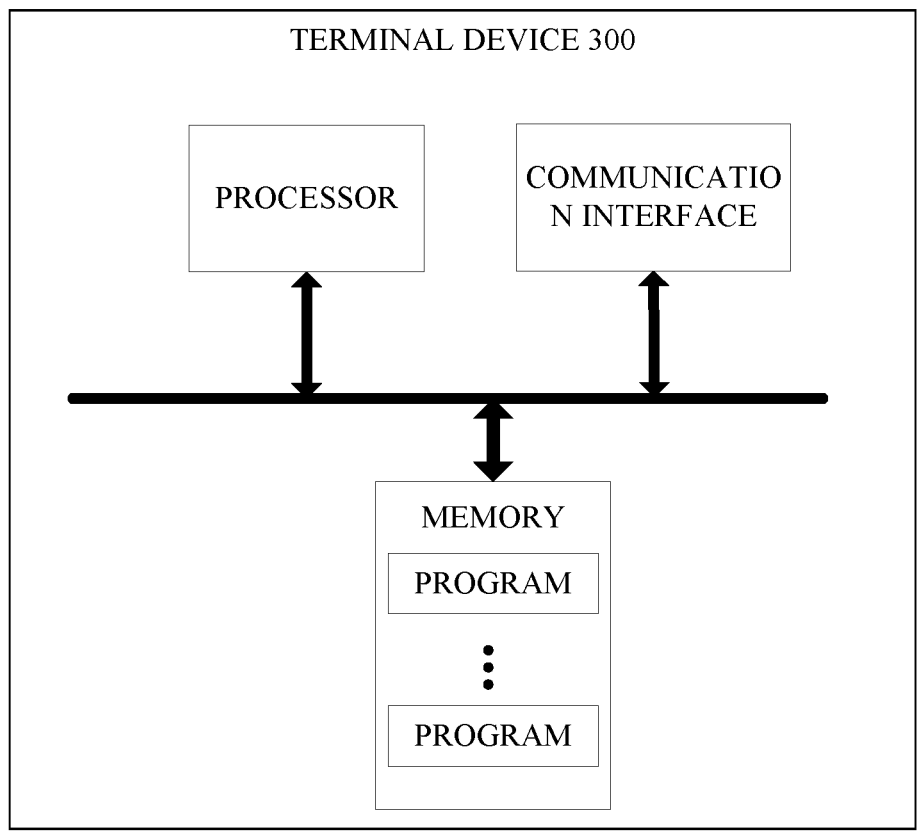
FIG. 3 is a schematic structural diagram illustrating a terminal device according to an implementation of the present disclosure.

FIG. 3 illustrates a terminal device 300 according to an implementation of the present disclosure. The terminal device 300 includes at least one processor, at least one memory, at least one communication interface, and one or more programs.

The one or more programs are stored in the memory and are configured to be executed by the processor. The programs include instructions configured to perform the following operations.

Unlocking-related information corresponding to a current successful unlocking operation is obtained.

Privacy information of at least one application is hidden or deleted when the unlocking-related information and recorded unlocking habit information do not meet a preset condition.

As one implementation, the programs further include instructions configured to perform the following operations.

Abnormal information is sent to a designated user when hiding or deleting the privacy information of the at least one application installed in the terminal device, where the abnormal information is configured to indicate that the terminal device is in an abnormal unlocking state.

As one implementation, the unlocking-related information includes a screen state i, an unlocking time j, and an unlocking mode k used when unlocking authentication information is entered. The recorded unlocking habit information includes a screen state I, a time period J corresponding to the screen state I, and an unlocking mode K used in the screen state I and the time period J. Determine that the unlocking-related information and the recorded unlocking habit information meet the preset condition when the screen state i matches the screen state I, the unlocking time j falls within the time period J, and the unlocking mode k matches the unlocking mode K.

As one implementation, each application corresponds to at least one kind of privacy information to be hidden or to be deleted. The instructions of the programs configured to perform the hiding or deleting privacy information of at least one application are configured to perform: hiding or deleting the at least one kind of privacy information to be hidden or to be deleted which corresponds to the at least one application.

As one implementation, the privacy information includes record information, a setting of an application i includes a private setting, and the private setting includes a record information setting. The programs further include instructions configured to perform the following when record information of the application i is hidden and the application i is one of the at least one application.

A user to is prompted to enter authentication information when detecting that the record information setting of the application i is set to be displayed, where the authentication information is different from the unlocking authentication information used for unlocking.

According to schemes of the disclosure, when the unlocking-related information corresponding to the current successful unlocking operation and the recorded unlocking habit information do not meet the preset condition, it indicates that the current unlocking operation is an abnormal unlocking operation. As a result, the privacy information of the at least one application is directly hidden or deleted to improve security of the terminal device.

Figure 4:
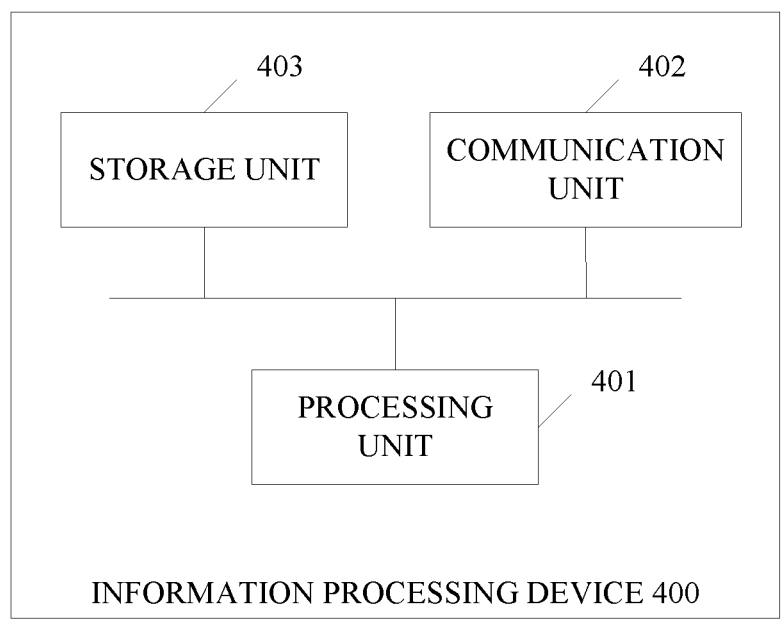
FIG. 4 is a schematic structural diagram illustrating an information processing device according to an implementation of the present disclosure.

FIG. 4 is a schematic structural diagram illustrating an information processing device 400 according to an implementation of the present disclosure. The information processing device 400 includes a processing unit 401, a communication unit 402, and a storage unit 403.

The processing unit 401 is configured to: obtain unlocking-related information corresponding to a current successful unlocking operation and hide or delete privacy information of at least one application when the unlocking-related information and recorded unlocking habit information do not meet a preset condition.

The processing unit 401 may be, a processor or a controller (for example, a central processing unit (CPU)), a general-purpose processor, a digital signal processor (DSP), an application specific integrated circuit (ASIC), a field programmable gate array (FPGA), or other programmable logic devices, transistor logic devices, hardware components, or any combination thereof. Various exemplary logical blocks, modules, and circuits described in conjunction with the disclosure may be achieved or implemented. The processor may also be a combination of computing functions, for example, a combination of one or more microprocessors, a combination of the DSP and the microprocessor, and the like. The communication unit 402 may be a transceiver, a transceiver circuit, a radio frequency chip, a communication interface, or the like. The storage unit 403 may be a memory.

When the processing unit 401 is the processor, the communication unit 402 is the communication interface, and the storage unit 403 is the memory, the information processing device related to the implementations of the disclosure can be a terminal device illustrated in FIG. 3.

Figure 5:
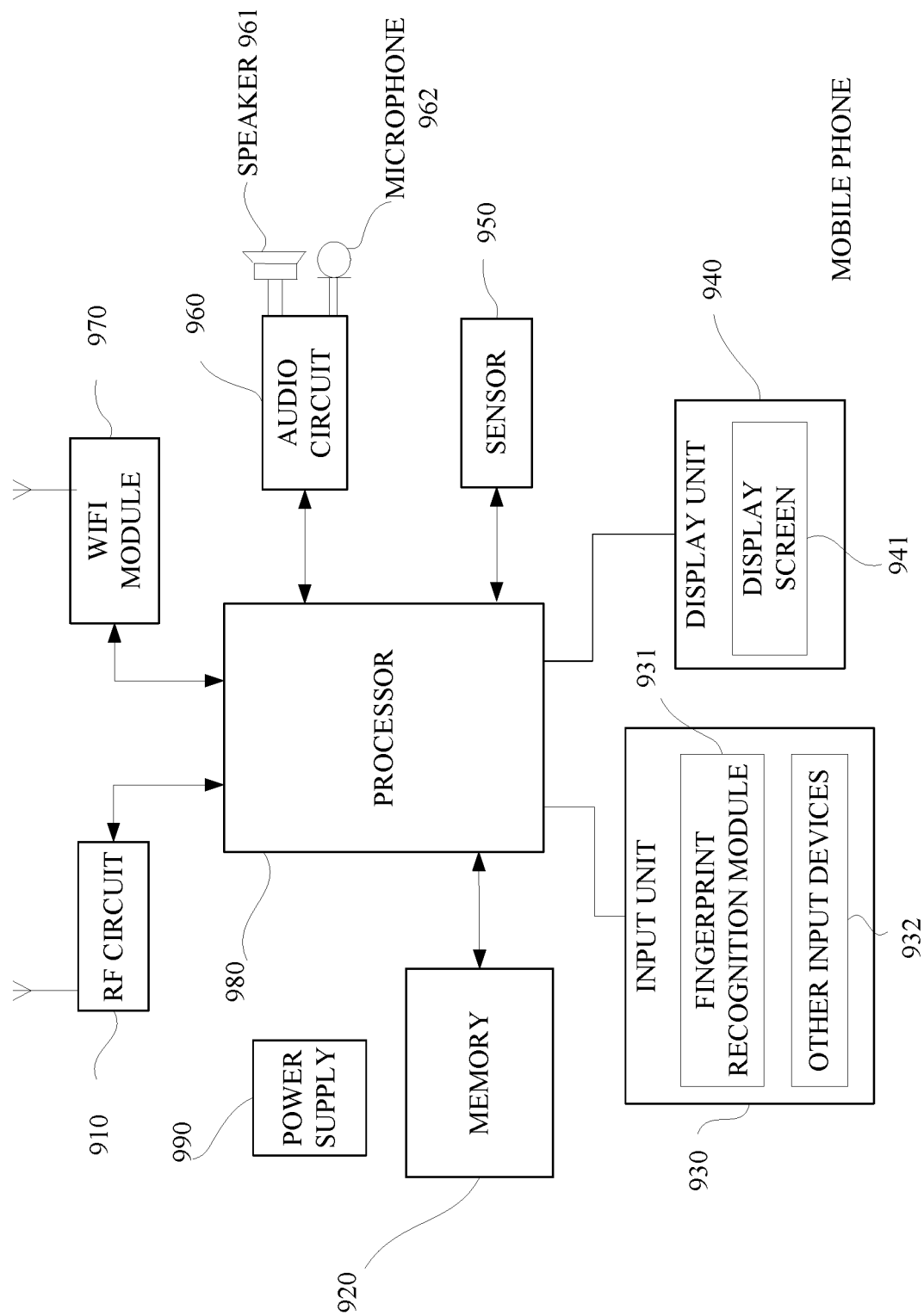
FIG. 5 is a schematic structural diagram illustrating another terminal device according to an implementation of the present disclosure.

An implementation of the present disclosure further provides another terminal device. As illustrated in FIG. 5, only parts related to the implementations of the present disclosure are illustrated for ease of description. For technical details not described, reference may be made to the method implementations of the present disclosure. The terminal device may be any terminal device, such as a mobile phone, a tablet computer, a personal digital assistant (PDA), a point of sale terminal (POS), an on-board computer and the like. The following describes the mobile phone as an example of the terminal device.

FIG. 5 is a block diagram of a part of a structure of a mobile phone related to a terminal device according to an implementation of the present disclosure. As illustrated in FIG. 5, the mobile phone includes an RF (radio frequency) circuit 910, a memory 920, an input unit 930, a display unit 940, a sensor 950, an audio circuit 960, a Wi-Fi (wireless fidelity) module 970, a processor 980, a power supply 990 and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated or may combine certain components or different components.

In the following, various components of the mobile phone will be described in detail with reference to FIG. 5.

The RF circuit 910 is configured to transmit or receive information. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function and so on. The data storage area may store data (such as usage parameters of an application) created according to use of the mobile phone, and so on. In addition, the memory 920 may include a high-speed RAM, and may further include a non-volatile memory such as at least one disk storage device, a flash device, or other non-volatile solid storage devices.

The input unit 930 may be configured to receive input digital or character information and generate key signal input associated with user setting and function control of the mobile phone. As one implementation, the input unit 930 may include a fingerprint recognition module 931 and other input devices 932. The fingerprint recognition module 931 can collect fingerprint data of the user. In addition to the fingerprint recognition module 931, the input unit 930 may further include other input devices 932. As one implementation, the other input devices 932 may include, but not limited to, one or more of a touch screen, a physical key, a function key (such as a volume control key, a switch key, etc.), a trackball, a mouse, a joystick, and the like.

The display unit 940 is configured to display information input by the user or information provided for the user or various menus of the mobile phone. The display unit 940 may include a display screen 941, and alternatively, the display screen 941 may be in the form of a liquid crystal display (LCD), an organic light-emitting diode (OLED) and so on. Although the fingerprint recognition module 931 and the display screen 941 are illustrated as two separate components in FIG. 5 to realize the input and output functions of the mobile phone, in some implementations, the fingerprint recognition module 931 may be integrated with the display screen 941 to implement the input and output functions of the mobile phone.

The mobile phone may also include at least one sensor 950, such as a light sensor, a motion sensor, and other sensors. As one implementation, the light sensor may include an ambient light sensor and a proximity sensor, among which the ambient light sensor may adjust the brightness of the display screen 941 according to ambient lights, and the proximity sensor may turn off the display screen 941 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and infrared sensor and other sensors, and it will not be repeated herein.

The audio circuit 960, the speaker 961, the microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals to output. On the other hand, the microphone 962 converts the received sound signals into electrical signals, which will be received and converted into audio data by the audio circuit 960 to output. The audio data is then processed and transmitted by the processor 980 via an RF circuit 910 to another mobile phone for example, or, the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media and the like. Wi-Fi provides users with wireless broadband Internet access. Although the Wi-Fi module 970 is illustrated in FIG. 5, the Wi-Fi module 970 is not essential to the mobile phone and can be omitted according to actual needs without departing from the essential nature of the present disclosure.

The processor 980 is the control center of the mobile phone, it connects various parts of the whole mobile phone through various interfaces and lines, runs or executes software programs and/or modules stored in the memory 920, and invokes data stored in the memory 920 to perform various functions of the mobile phone and process data, thereby monitoring the mobile phone as a whole. In at least one implementation, the processor 980 may include one or more processing units; for example, the processor 980 may integrate an application processor and a modem processor, where the application processor handles the operating system, the user interface, the application, and so on, and the modem processor mainly processes wireless communication. It will be understood that the above-mentioned modem processor may not be integrated into the processor 980.

The mobile phone also includes a power supply 990 (e.g., a battery) that supplies power to various components. For instance, the power supply 990 may be logically connected to the processor 980 via a power management system to enable management of charging, discharging, and power consumption through the power management system.

Although not illustrated, the mobile phone may include a camera, a Bluetooth module, etc., and the disclosure will not elaborate herein.

The method of the foregoing implementations illustrated in FIG. 1 can be realized based on the structure of the mobile phone.

The functions of the units illustrated in FIG. 4 can be achieved based on the structure of the mobile phone.

Implementations of the present disclosure also provide a non-transitory computer readable storage medium. The computer readable storage medium stores a computer program for electronic data interchange which, when executed, is operable with a computer to accomplish all or part of the operations of any of the methods described in the above-described method implementation.

As one implementation, the computer programs are operable with a processor to: obtain first unlocking information (such as the unlocking-related information mentioned above) corresponding to a current successful unlocking operation; compare the first unlocking information with second unlocking information (such as the recorded unlocking habit information mentioned above) stored in a terminal device; hide or delete privacy information of at least one application when the first unlocking information is not matched with the second unlocking information.

The second unlocking information is obtained by training usage history of a user of the terminal device and is configured to represent usage habits of the user.

The first unlocking information includes a first screen state, an unlocking time, and a first unlocking mode corresponding to the current successful unlocking operation, and the second unlocking information includes a second screen state, an unlocking time period, and a second unlocking mode corresponding to usage habits, where the first unlocking information is matched with the second unlocking information when the first screen state is the same as the second screen state, the unlocking time falls within the unlocking time period, and the first unlocking mode is the same as the second unlocking mode.

In at least one implementation, the computer programs are operable with a processor to send abnormal information to a designated user when hiding or deleting the privacy information of the at least one application, where the abnormal information is configured to indicate that the terminal device is in an abnormal unlocking state.

Implementations of the present disclosure also provide a computer program product. The computer program product includes a non-transitory computer readable storage medium storing computer programs. The computer programs are operable with a computer to perform all or part of the operations of any of the methods described in the above method implementations. The computer program product may be a software installation package.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on)

to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for information processing, comprising:
obtaining unlocking-related information corresponding to a current successful unlocking operation; and
hiding or deleting privacy information of at least one application when a relationship between the unlocking-related information and recorded unlocking habit information does not meet a preset condition; wherein:
the unlocking-related information comprises a screen state i, an unlocking time j, and an unlocking mode k used when unlocking authentication information is entered;
the recorded unlocking habit information comprises a screen state I, a time period J corresponding to the screen state I, and an unlocking mode K used in the screen state I and the time period J; and
the method further comprises determining that the relationship between the unlocking-related information and the recorded unlocking habit information meets the preset condition when the screen state i matches the screen state I, the unlocking time j falls within the time period J, and the unlocking mode k matches the unlocking mode K.

2. The method of claim 1, further comprising:
sending abnormal information to a designated user when hiding or deleting the privacy information of the at least one application installed in a terminal device, wherein the abnormal information is configured to indicate that the terminal device is in an abnormal unlocking state.

3. The method of claim 2, wherein the designated user is determined by the terminal device based on usage information of the terminal device.

4. The method of claim 2, wherein the designated user is a user involved in the most recent communication record of the terminal device or a user having the number of times of communication in a preset time period exceeding a preset value and having a most recent communication time earlier than a current system time by no more than a preset time.

5. The method of claim 1, wherein each application corresponds to at least one kind of privacy information to be hidden or to be deleted, and the hiding or deleting privacy information of at least one application comprises:
hiding or deleting at least one kind of privacy information to be hidden or to be deleted which corresponds to the at least one application.

6. The method of claim 1, wherein the privacy information comprises record information, and a setting of privacy information comprises a setting of record information.

7. The method of claim 6, further comprising:
prompting a user to enter authentication information when the user switches the setting of the record information to a display state from a hidden state, wherein the authentication information is different from unlocking authentication information used for unlocking.

8. A terminal device, comprising:
a memory configured to store one or more programs; and
a processor coupled with the memory and configured to invoke the one or more programs to:
obtain unlocking-related information corresponding to a current successful unlocking operation; and
hide or delete privacy information of at least one application when a relationship between the unlocking-related information and recorded unlocking habit information do not meet a preset condition; wherein:
the unlocking-related information comprises a screen state i, an unlocking time j, and an unlocking mode k used when unlocking authentication information is entered;
the recorded unlocking habit information comprises a screen state I, a time period J corresponding to the screen state I, and an unlocking mode K used in the screen state I and the time period J; and
the processor is further configured to invoke the programs to determine that the relationship between the unlocking-related information and the recorded unlocking habit information meets the preset condition when the screen state i matches the screen state I, the unlocking time j falls within the time period J, and the unlocking mode k matches the unlocking mode K.

9. The terminal device of claim 8, wherein the processor is further configured to invoke the programs to:
send abnormal information to a designated user when hiding or deleting the privacy information of the at least one application installed in the terminal device, wherein the abnormal information is configured to indicate that the terminal device is in an abnormal unlocking state.

10. The terminal device of claim 9, wherein the processor is further configured to invoke the programs to determine the designated user based on usage information of the terminal device.

11. The terminal device of claim 9, wherein the designated user is a user involved in the most recent communication record of the terminal device, or a user having the number of times of communication in a preset time period exceeding a preset value and having a most recent communication time earlier than a current system time by no more than a preset time.

12. The terminal device of claim 8, wherein each application corresponds to at least one kind of privacy information to be hidden or to be deleted, and the processor configured to perform the hiding or deleting is further configured to invoke the programs to perform:
hiding or deleting the at least one kind of privacy information to be hidden or to be deleted which corresponds to the at least one application.

13. The terminal device of claim 8, wherein the privacy information comprises record information, and a setting of privacy information comprises a setting of record information.

14. The terminal device of claim 13, wherein the processor is further configured to invoke the programs to:

prompt a user to enter authentication information when the user switches the setting of the record information to a display state from a hidden state, wherein the authentication information is different from unlocking authentication information used for unlocking.

15. A non-transitory computer readable storage medium configured to store computer programs for electronic data interchange, wherein the computer programs are operable with a processor to:
   obtain first unlocking information corresponding to a current successful unlocking operation;
   compare the first unlocking information with second unlocking information stored in a terminal device; and
   hide or delete privacy information of at least one application when the first unlocking information is not matched with the second unlocking information; wherein:
   the first unlocking information comprises a first screen state, an unlocking time, and a first unlocking mode corresponding to the current successful unlocking operation; and
   the second unlocking information comprises a second screen state, an unlocking time period, and a second unlocking mode corresponding to the usage habits, wherein the first unlocking information is matched with the second unlocking information when the first screen state is the same as the second screen state, the unlocking time falls within the unlocking time period, and the first unlocking mode is the same as the second unlocking mode.

16. The non-transitory computer readable storage medium of claim 15, wherein the second unlocking information is obtained by training usage history of a user of the terminal device and is configured to represent usage habits of the user.

17. The non-transitory computer readable storage medium of claim 15, wherein the computer programs are further operable with a processor to:
   send abnormal information to a designated user when hiding or deleting the privacy information of the at least one application, wherein the abnormal information is configured to indicate that the terminal device is in an abnormal unlocking state.

* * * * *